US012104407B1

(12) United States Patent
Wu

(10) Patent No.: US 12,104,407 B1

(45) Date of Patent: Oct. 1, 2024

(54) MULTIFUNCTIONAL DOOR LOCK

(71) Applicant: Dandan Wu, Guizhou (CN)

(72) Inventor: Dandan Wu, Guizhou (CN)

( * ) Notice: Subject to any disclaimer, the term of this patent is extended or adjusted under 35 U.S.C. 154(b) by 0 days.

(21) Appl. No.: 18/430,278

(22) Filed: Feb. 1, 2024

(51) Int. Cl.
*E05B 47/00* (2006.01)
*E05B 1/00* (2006.01)

(52) U.S. Cl.
CPC ........ *E05B 47/0012* (2013.01); *E05B 1/0007* (2013.01); *E05B 2047/002* (2013.01); *E05B 2047/0054* (2013.01); *E05B 2047/0081* (2013.01)

(58) Field of Classification Search
CPC .... E05B 47/00; E05B 47/0012; E05B 1/0007; E05B 2047/002; E05B 2047/0054; E05B 2047/0081; Y10T 70/7068; Y10T 70/7073
USPC ........................................................ 70/278.1
See application file for complete search history.

(56) References Cited

U.S. PATENT DOCUMENTS 4,901,545 A * 2/1990 Bacon ................. E05B 47/0653 70/285
5,487,290 A * 1/1996 Miller ................. E05B 65/0075 292/144
5,841,361 A * 11/1998 Hoffman .............. G07C 9/0069 70/278.1
6,588,243 B1 * 7/2003 Hyatt, Jr. ............ E05B 47/0603 70/278.1
2013/0298616 A1 * 11/2013 Ullrich ................ E05B 47/0012 70/278.1
2014/0250956 A1 * 9/2014 Chong ............... G07C 9/00944 70/278.1
2017/0016249 A1 * 1/2017 Johnson ........... G08B 13/19656
2017/0275096 A1 * 9/2017 Georgas ..................... B65F 1/12
2018/0073275 A1 * 3/2018 Ullrich ............... G07C 9/00182
2018/0163431 A1 * 6/2018 Bliding ............... E05B 47/0012
2021/0034882 A1 * 2/2021 Johnson ............. G07C 9/00309
2021/0143774 A1 * 5/2021 Cummings ....... H01M 10/6551
2021/0396046 A1 * 12/2021 Johnson ................ E05B 47/026
2023/0051877 A1 * 2/2023 Liang .................. E05B 47/0012
2023/0069249 A1 * 3/2023 Bos ..................... E05B 47/0603
(Continued)

FOREIGN PATENT DOCUMENTS

CA 2217410 A1 * 4/1998
CN 106088829 A * 11/2016
(Continued)

*Primary Examiner* — Suzanne L Barrett

(74) *Attorney, Agent, or Firm* — Hawaii Patent Services; Nathaniel K. Fedde; Kenton N. Fedde

(57) ABSTRACT

A novel multifunctional door lock comprises a main body and a locking device, wherein the locking device is arranged inside the main body; the main body is provided with an input module which can generate an input instruction and transmit the input instruction to the locking device; the locking device comprises a circuit board and a locking mechanism, wherein the circuit board can generate a control signal according to the input instruction; the locking mechanism can respond to the input instructions or control signal and move between a locked position and an unlocked position; the circuit board is provided with a limit switch, and the locking mechanism comprises a limit member and a motor, wherein the limit member is operated to contact the limit switch in the locked position and the unlocked position, and when the limit member contacts the limit switch, the motor stops working.

18 Claims, 14 Drawing Sheets

(56) References Cited

U.S. PATENT DOCUMENTS

| | | | | | |
|---|---|---|---|---|---|
| 2023/0125130 | A1* | 4/2023 | Chong | ................ | E05B 63/0017 70/278.7 |
| 2023/0245513 | A1* | 8/2023 | LeBlanc | ............ | G07C 9/00904 340/5.64 |

FOREIGN PATENT DOCUMENTS

| | | | | | |
|---|---|---|---|---|---|
| CN | 115450500 | A | * | 12/2022 | |
| CN | 116733301 | A | * | 9/2023 | ............. E05B 15/00 |
| DE | 202013008865 | U1 | * | 10/2013 | |
| FR | 2650620 | A1 | * | 2/1991 | |
| FR | 2717408 | A1 | * | 9/1995 | |
| WO | WO-9512047 | A1 | * | 5/1995 | ......... E05B 47/0688 |
| WO | WO-2016196192 | A1 | * | 12/2016 | |
| WO | WO-2019068021 | A1 | * | 4/2019 | ......... E05B 47/0012 |
| WO | WO-2022149160 | A1 | * | 7/2022 | |

* cited by examiner

MULTIFUNCTIONAL DOOR LOCK

TECHNICAL FIELD

The present invention relates to the technical field of door locks, in particular to a novel multifunctional door lock.

BACKGROUND

At present, most of the smart locks on the market are password locks or fingerprint locks. Although the locks are generally equipped with use buttons, the locks are bulky and are not equipped with special handles for users to open or close the doors, which is very inconvenient to use. At the same time, the traditional door lock has a short service life and cannot be used for a long time.

U.S. patent application Ser. No. 17/676,259 discloses an intelligent door lock assembly, a clutch control method of the intelligent door lock assembly and an intelligent door lock. The door lock is provided with a manual knob and a lock core, and the lock core is rotated by rotating the manual knob to unlock the door lock. However, this door lock is too large in size and is not provided with a handle, which is inconvenient for users to pull the door lock by hand to realize the operation of opening and closing the door and is very inconvenient to use.

U.S. patent application Ser. No. 10/812,234 discloses an electric cylinder for actuating a door lock and a cylindrical door lock, which has a cylindrical outer shell and is convenient for a user to screw the door lock. This kind of door lock brakes the latch through the motor, so as to realize the opening and closing of the door lock. However, this method cannot limit the rotation of the motor and the life span of the motor, so that the door lock cannot be protected, and the service life of the door lock is short.

Based on the above problems, it is necessary to provide a brand-new door lock, which has a variety of unlocking methods, and is small in size and convenient to use. At the same time, the lock has a long service life and does not need to be replaced frequently, thus improving the user's experience.

SUMMARY

The present invention provides a novel multifunctional door lock, which includes a main body and a locking device, wherein the locking device is arranged inside the main body; and wherein the main body is further provided with at least one input module, and the input module is capable of generating an input instruction in response to an operation of a user and transmitting the input instruction to the locking device; and wherein, the locking device includes a circuit board and at least one locking mechanism, and the circuit board is capable of generating a control signal according to the input instruction; and wherein the locking mechanism is capable of moving between a locked position and an unlocked position in response to the input instruction or the control signal; and wherein the circuit board is provided with at least one limit switch, and the locking mechanism includes a limit member and at least one motor, wherein the limit member is operable to contact the limit switch in the locked position and the unlocked position, and when the limit member contacts the limit switch, the motor stops working.

The present invention further provides a novel multifunctional door lock, which includes a main body, a locking device and an input module; and wherein, the main body includes an outer shell and an inner shell, and the locking device includes a locking mechanism, a circuit board and a lock tongue module; and wherein, the locking mechanism and the circuit board are arranged in the inner shell, the input module is arranged in the outer shell, and the lock tongue module is arranged between the outer shell and the inner shell; and wherein, the lock tongue module is in transmission connection with the locking mechanism, and the locking mechanism is capable of responding to an operation of a user to drive the lock tongue module to move between a locked position and an unlocked position; and wherein the circuit board is provided with at least one limit switch, and the locking mechanism includes a limit member and at least one motor, wherein the limit member is operable to contact the limit switch in the locked position and the unlocked position, and when the limit member contacts the limit switch, the motor stops working.

The present invention further provides a method for accessing a safe space, including providing a novel multifunctional door lock, which includes a main body and a locking device, wherein the locking device is arranged inside the main body; and wherein the main body is further provided with at least one input module, and the input module is capable of generating an input instruction in response to an operation of a user and transmitting the input instruction to the locking device; and wherein, the locking device includes a circuit board and at least one locking mechanism, and the circuit board is capable of generating a control signal according to the input instruction; and wherein the locking mechanism is capable of moving between a locked position and an unlocked position in response to the input instruction or the control signal; and wherein the circuit board is provided with at least one limit switch, and the locking mechanism includes a limit member and at least one motor, wherein the limit member is operable to contact the limit switch in the locked position and the unlocked position, and when the limit member contacts the limit switch, the motor stops working.

the method includes the following steps:

fixing the novel multifunctional door lock on a door; and generating an input instruction by the input module; and unlocking or locking the novel multifunctional door lock by the locking device.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
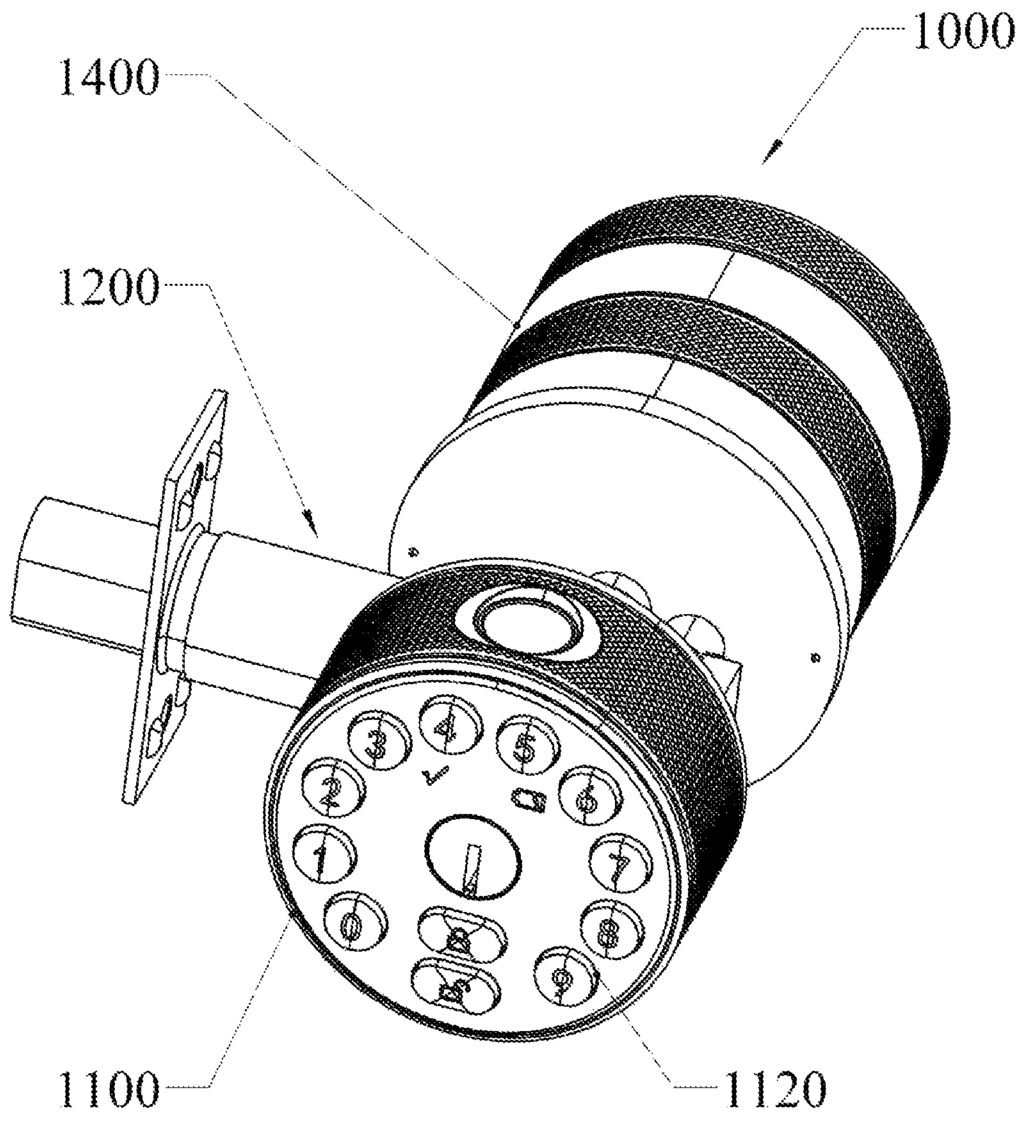
FIG. 1 is a schematic diagram of a novel multifunctional door lock in the application of the present invention.

Door (10); Main body (1000); Outer shell (1100); Outer shell outer surface (1101); Anti-skid line (1110); Input module (1120); Lock button (1121); Unlock button (1122); Password button (1123); Keyhole (1124); Fingerprint device (1125); Locking device (1200); Circuit board (1210); Control unit (1220); Limit switch (1230); Lock tongue module (1240); Lock tongue (1241); Lock body (1242); Door core (1243); Fastener (1244); Locking mechanism (1300); Limit member (1310); Protrusion (1311); Motor (1320); Driving shaft (1321); Inner shell (1400); inner shell outer surface (1401); Connecting hole (1402); First end cover (1410); Driving gear (1411); Driven gear (1412); Driving member (1413); Driving post (1414); Second end cover (1420); Third end cover (1430); Battery slot (1431); Fourth end cover (1440); Mechanical knob (1441); Electronic lock button (1442).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the application of the present invention, in order to enable the door lock to have various unlocking modes, reduce the size of the door lock, and at the same time, increase the service life of the lock without frequent replacement and improve the user's experience, the application of the present invention provides a novel multifunctional door lock.

Referring to FIG. 1, the novel multifunctional door lock includes a main body 1000, a locking device 1200 and an input module 1120, wherein the main body 1000 includes an outer shell 1100 and an inner shell 1400, and part of the locking device 1200 is located between the outer shell 1100 and the inner shell 1400.

Figure 2:
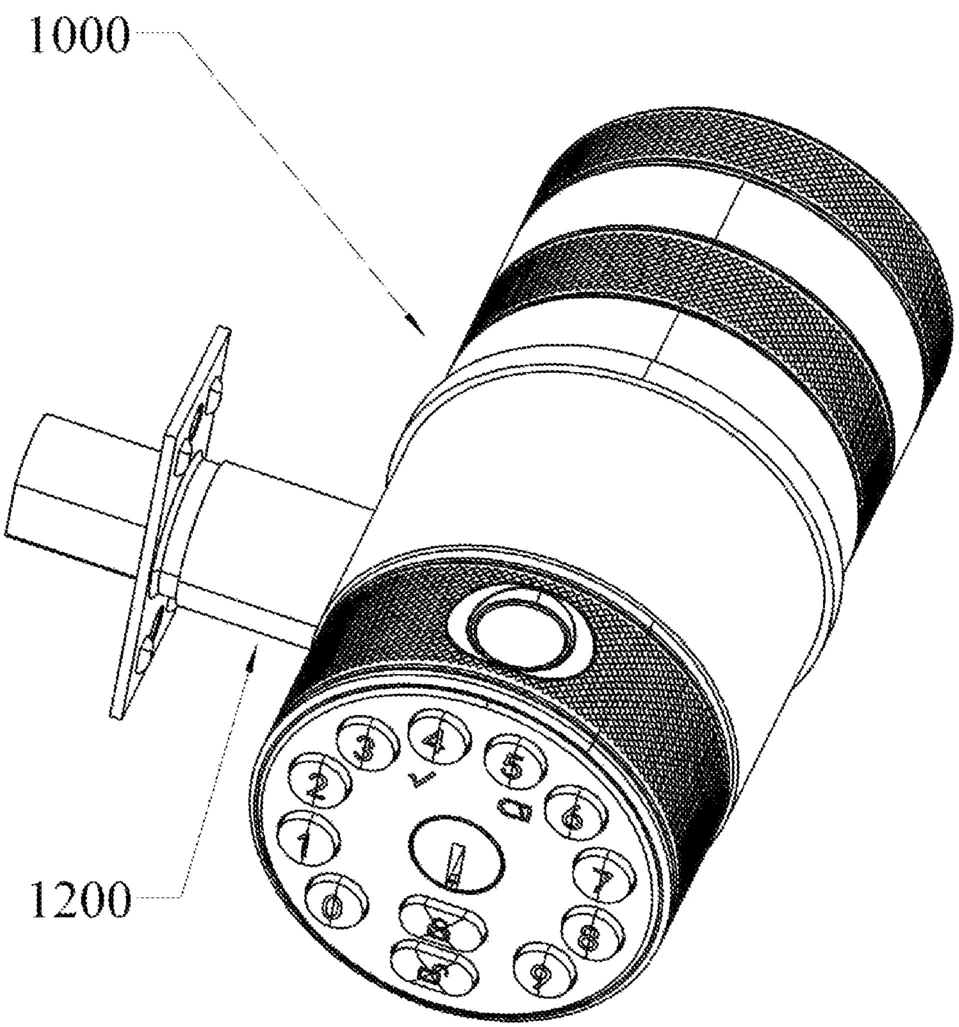
FIG. 2 is a schematic diagram of a novel multifunctional door lock in the application of the present invention.
Figure 3:
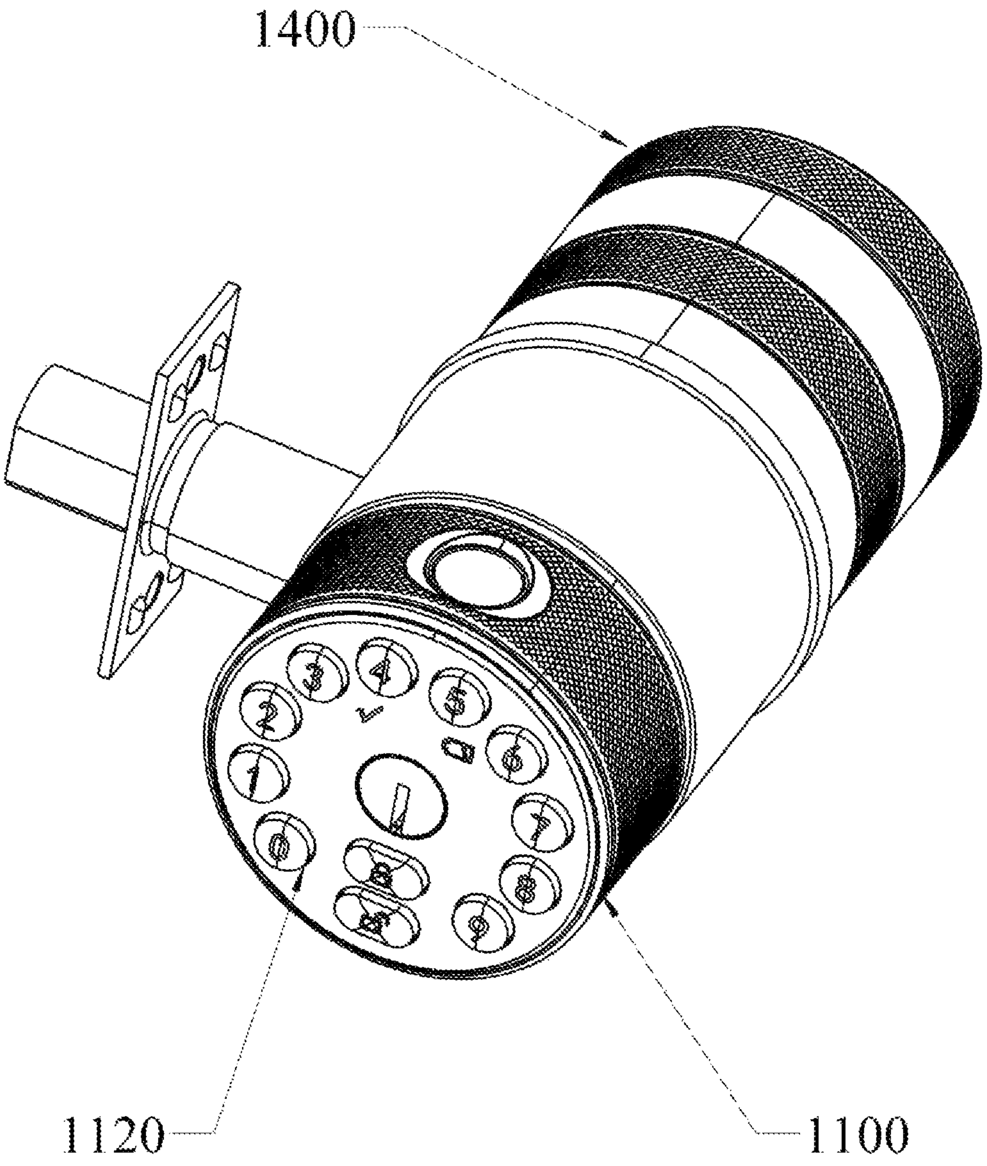
FIG. 3 is a schematic diagram of a novel multifunctional door lock in the application of the present invention.

In another preferred embodiment, referring to FIGS. 2 and 3, the novel multifunctional door lock includes a main body 1000 and a locking device 1200, and the locking device 1200 is located inside the main body 1000.

Referring to FIG. 1 to FIG. 5, both the outer shell 1100 and the inner shell 1400 have an outer surface, namely the outer shell outer surface 1101 and the inner shell outer surface 1401, and part of the two outer surfaces is provided with anti-skid lines 1110, so that users can better open and close the door 10 through the anti-skid lines 1110. The outer shell 1100 and the inner shell 1400 are spherical structures, which can better conform to the radian of the human palm and provide a better grip.

In other embodiments (not shown in the figure), the shape of the outer shell 1100 and the inner shell 1400 can also be a square structure, or an oval structure, or a diamond structure and other various irregular patterns and curved structures, as long as the user can open or close the door 10 through the shape structure of the outer shell 1100 and the inner shell 1400.

Referring to FIGS. 1 to 5, the input module 1120 is arranged in the outer shell 1100. The input module 1120 includes at least three input modes to unlock and lock the novel multifunctional door lock. In this embodiment, the input module 1120 includes a password button 1123, a keyhole 1124 and a fingerprint device 1125. In other embodiments (not shown in the figure), the input module 1120 can also include face recognition, pupil recognition, voice recognition, or other biological feature features such as button unlocking or mechanical operation to unlock and lock the door lock.

In other embodiments (not shown), the input module 1120 may also include physical buttons, such as rocker, dial, slide switch, touch switch, toggle switch and joystick, click wheel, etc. In some alternative embodiments (not shown), the input module 1120 may be coupled to any one of the following (or decoupled): a keyboard, an infrared port, a USB port and a pointing device, such as a mouse. In some embodiments (not shown), the input module 1120 may also be an electronic device, such as a touch screen, a computer device and other control system devices.

Figure 5:
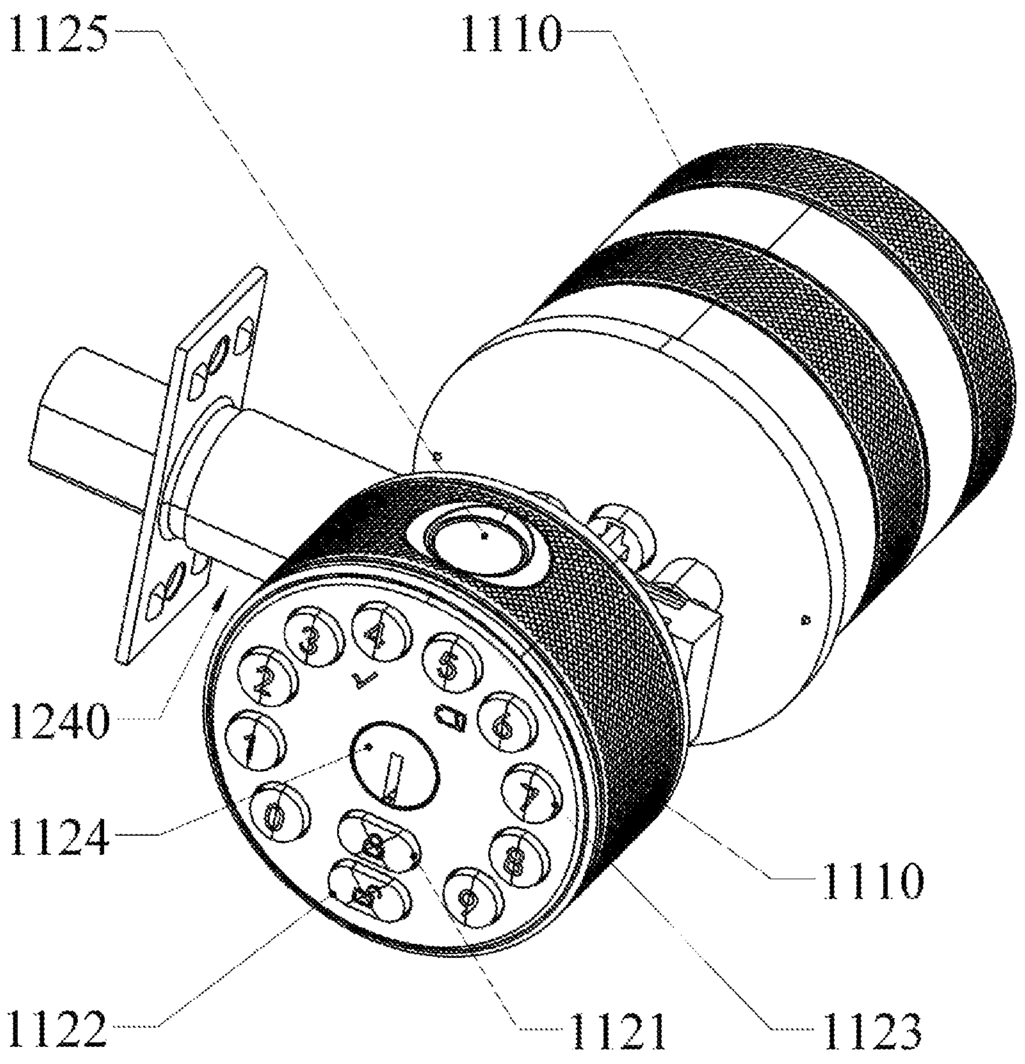
FIG. 5 is a schematic diagram of a novel multifunctional door lock in the application of the present invention.

Further, as shown in FIG. 5, the outer shell outer surface 1101 is provided with a lock button 1121 and an unlock button 1122, and the locking device 1200 can be controlled by pressing the two buttons, thereby realizing the opening and locking of the door lock.

Further, the novel multifunctional door lock applied by the present invention needs to be electrified to realize operation, and the outer shell 1100 and the inner shell 1400 communicate with each other through at least four wires, and the four wires respectively correspond to the positive wire, the negative wire and two wires for wired communication. Through two communication wires, the inner shell 1400 can recognize the fingerprint or password transmitted from the outer shell 1100, thus unlocking the door lock.

In other embodiments (not shown in the figure), the outer shell 1100 and the inner shell 1400 can communicate by wires with other numbers of features. Wired communication channels between the outer shell 1100 and the inner shell 1400 include but are not limited to Ethernet protocol, USB protocol, HDMI protocol, RS-232C protocol, RS485 protocol and other wired communication channels.

In other embodiments (not shown in the figure), the outer shell 1100 and the inner shell 1400 can also communicate wirelessly, and the communication means can use any one of various communication standards, protocols and technologies, including, but not limited to, global system for mobile communications (GSM), enhanced data GSM environment (EDGE), high-speed downlink packet access (HSDPA), wideband code division multiple access (W-CDMA), code division multiple access (CDMA), time division multiple access (TDMA), BLUETOOTH®, wireless fidelity (Wi-Fi) (for example, IEEE802.11a, IEEE802.11b, IEEE802.11g or IEEE802.11n), Voice over Internet Protocol (VOIP), Wi-MAX, email protocol (e.g., Internet Message Access Protocol (IMAP) and/or post office protocol (POP)), instant messaging (e.g., Extensible Messaging and Presence Protocol (XMPP), SIP for Instant Messaging and Presence Leveraging Extensions (SIMPLE) or Instant Messaging Presence Services (IMPS), or Short Message Service (SMS), or any other suitable communication protocol, including those developed and not yet completed since the date of submission of this document.

Figure 6:
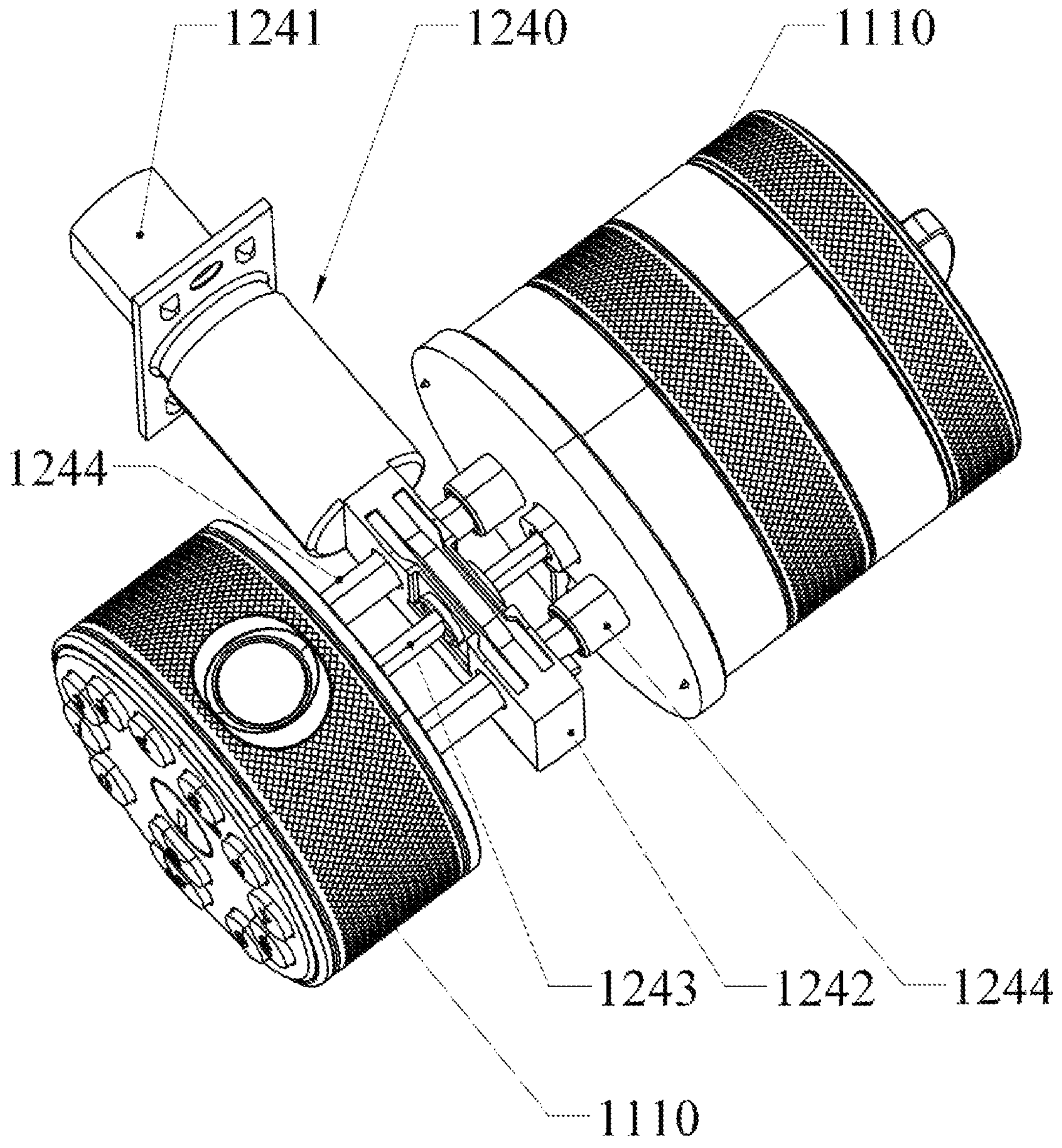
FIG. 6 is a schematic diagram of a novel multifunctional door lock in the application of the present invention.

Referring to FIGS. 5 and 6, the locking device 1200 includes a lock tongue module 1240, which is arranged between the outer shell 1100 and the inner shell 1400. In another preferred embodiment (see FIGS. 2 and 3), the lock tongue module 1240 can be arranged inside the main body 1000, and the lock tongue 1241 is exposed outside the main body 1000.

The lock tongue module 1240 includes a lock tongue 124 11 and a lock body 242. The lock body 1242 is fixed between the outer shell 1100 and the inner shell 1400 through a door core 1243 and a fastener 1244, and the outer shell 1100 and the inner shell 1400 are also connected and fixed through the fastener 1244.

In this embodiment, the fastener 1244 is a bolt. In other embodiments (not shown in the figure), the fastener 1244 can also be a button or other connector such as a buckle.

Further, one end of the door core 1243 is inserted into the keyhole 1124, and the other end is inserted into the inner shell 1400. By inserting a key and rotating the key, the door core 1243 will rotate with the rotation of the key, thereby unlocking the door lock.

Figure 4:
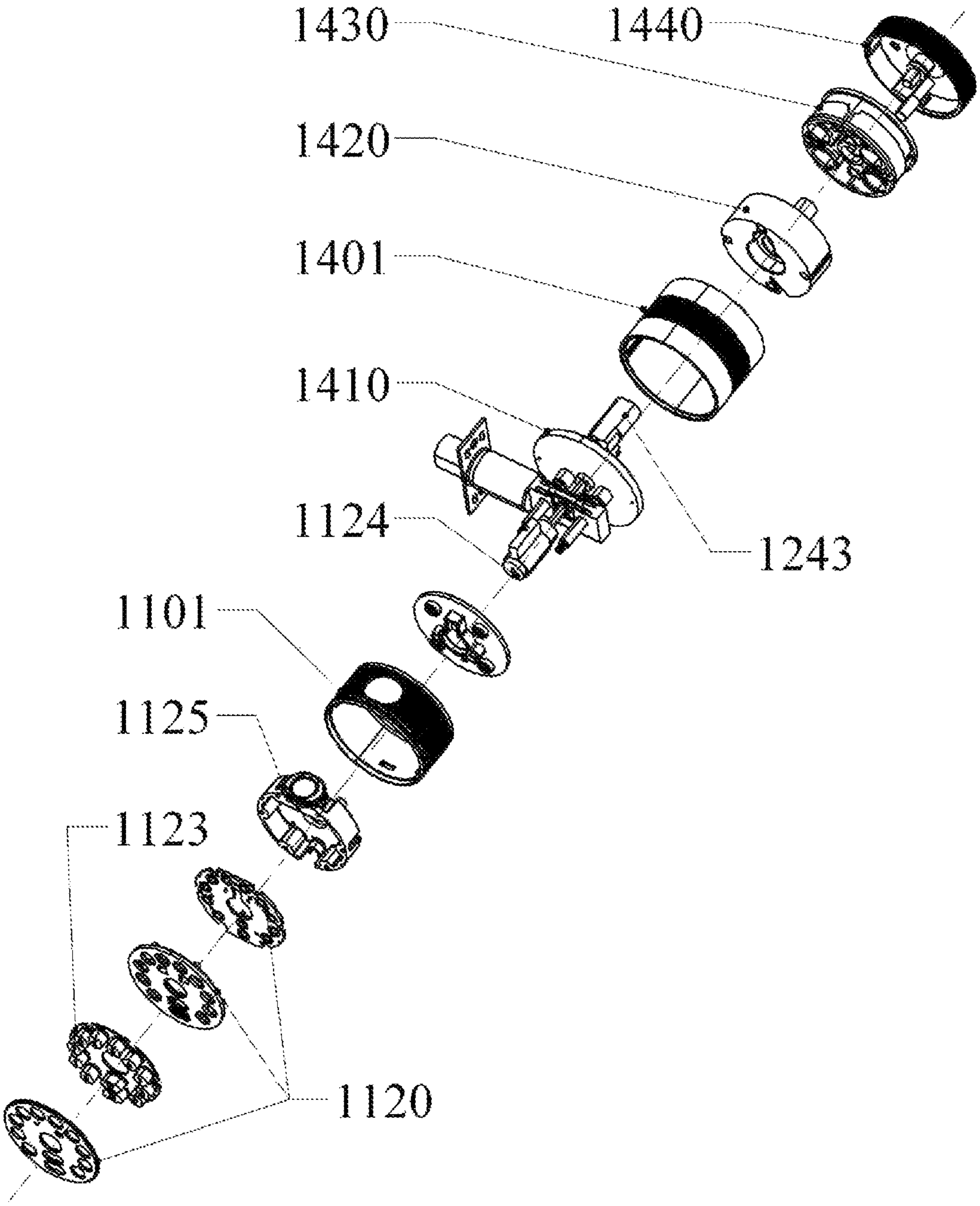
FIG. 4 is an explosion diagram of a novel multifunctional door lock in the application of the present invention.
Figure 8:
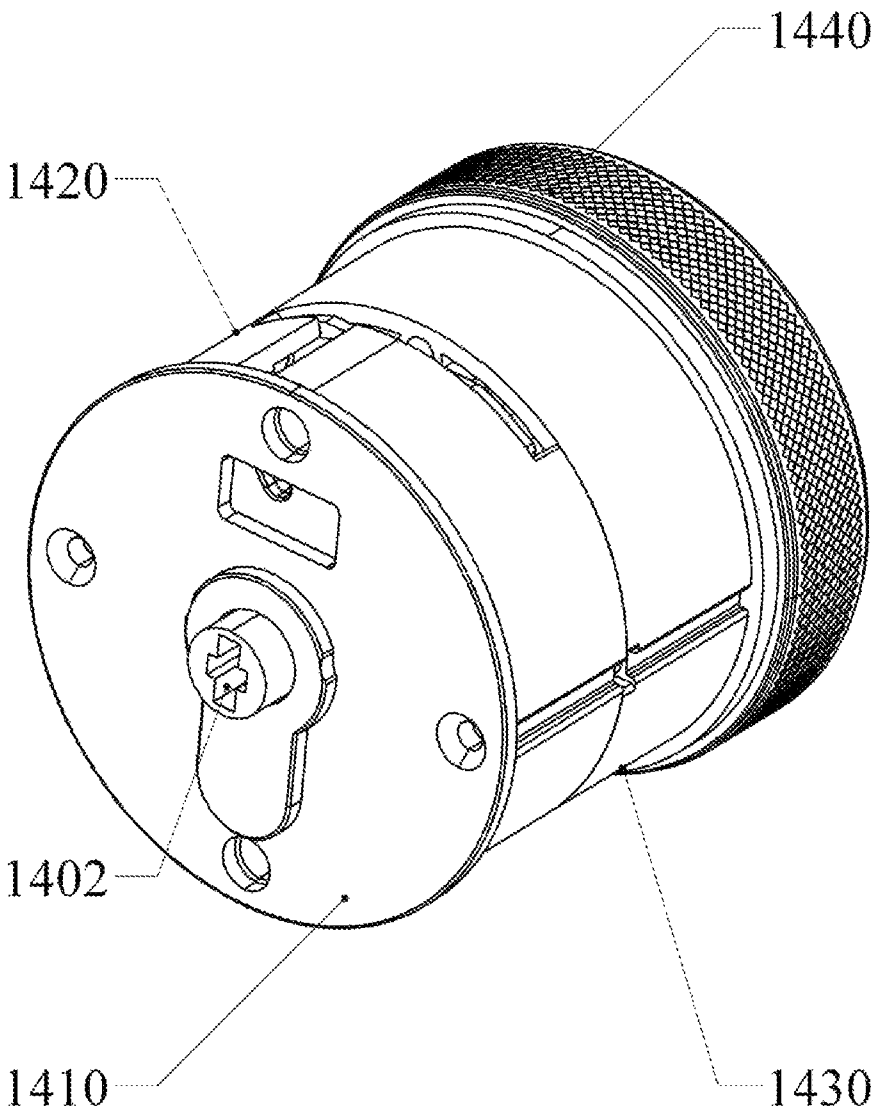
FIG. 8 is a schematic view of the inner shell in the application of the present invention.

Referring to FIGS. 4 and 8, the door core 1243 is connected to the first end cover 1410 and inserted into the connecting hole 1402, thus realizing the connection between the lock tongue module 1240 and the inner shell 1400. The inner shell 1400 includes a structure of four layers, namely a first end cover 1410, a second end cover 1420, a third end cover 1430 and a fourth end cover 1440, and the structure of four layers are all detachably connected.

Figure 9:
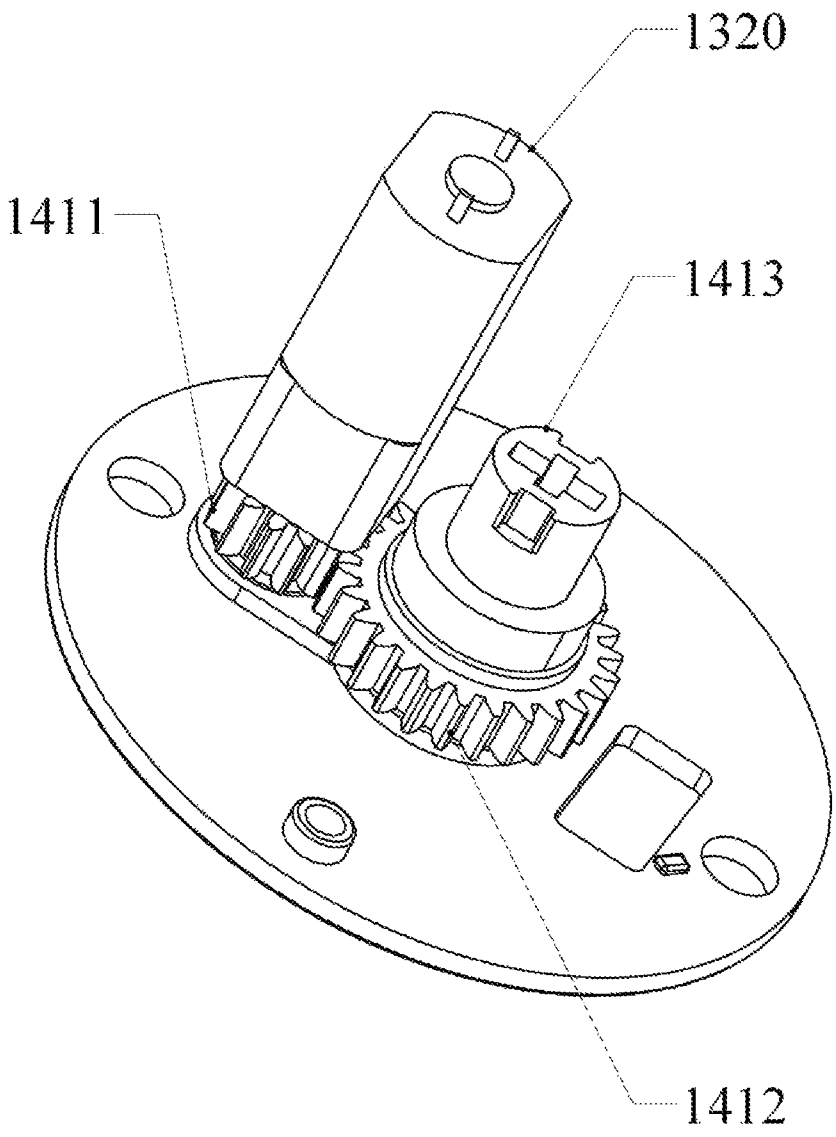
FIG. 9 is a schematic view of the first end cover in the application of the present invention.

Referring to FIG. 9, the first end cover 1410 is provided with a driving gear 1411 and a driven gear 1412, which are in rotational contact with each other, and the driving gear 1411 drives the driven gear 1412 to rotate. After being connected to the connecting hole 1402, the door core 1243 extends into the first end cover 1410 and is connected to the driven gear 1412.

In other embodiments (not shown in the figure), the transmission modes can also include but not limited to chain transmission, belt transmission, hydraulic transmission, pneumatic transmission and other transmission modes.

Figure 10:
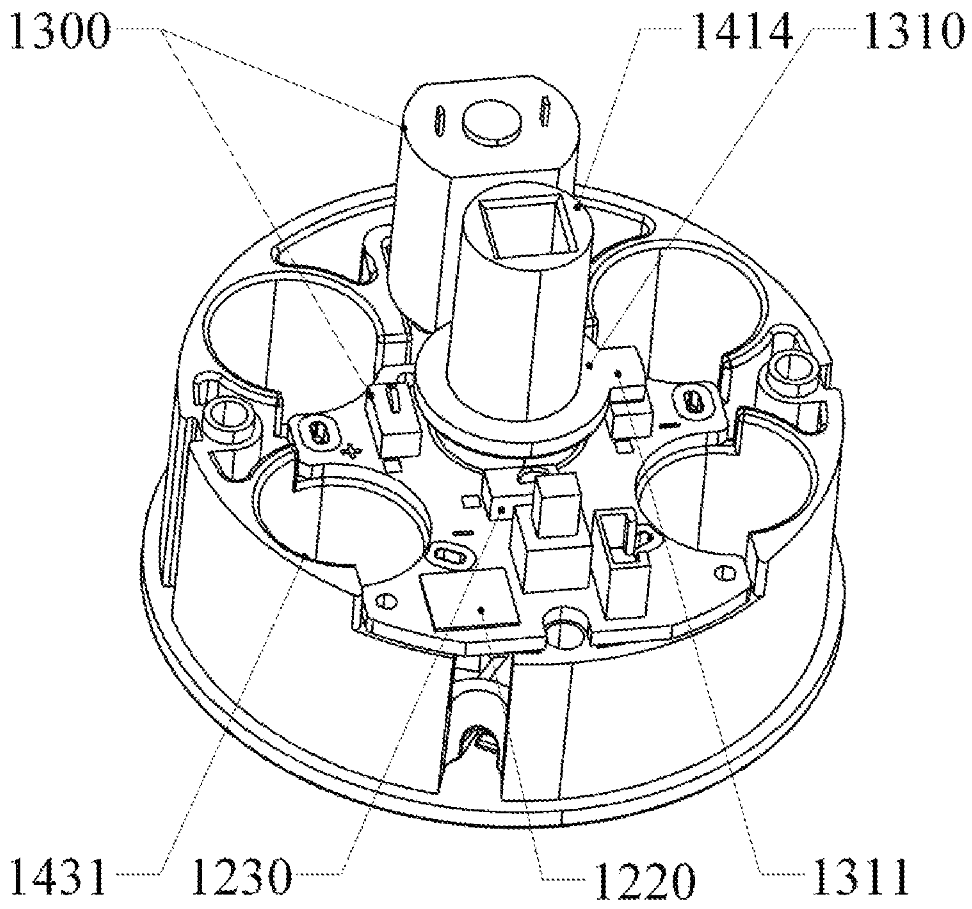
FIG. 10 is a schematic diagram of the second end cover in the application of the present invention.
Figure 11:
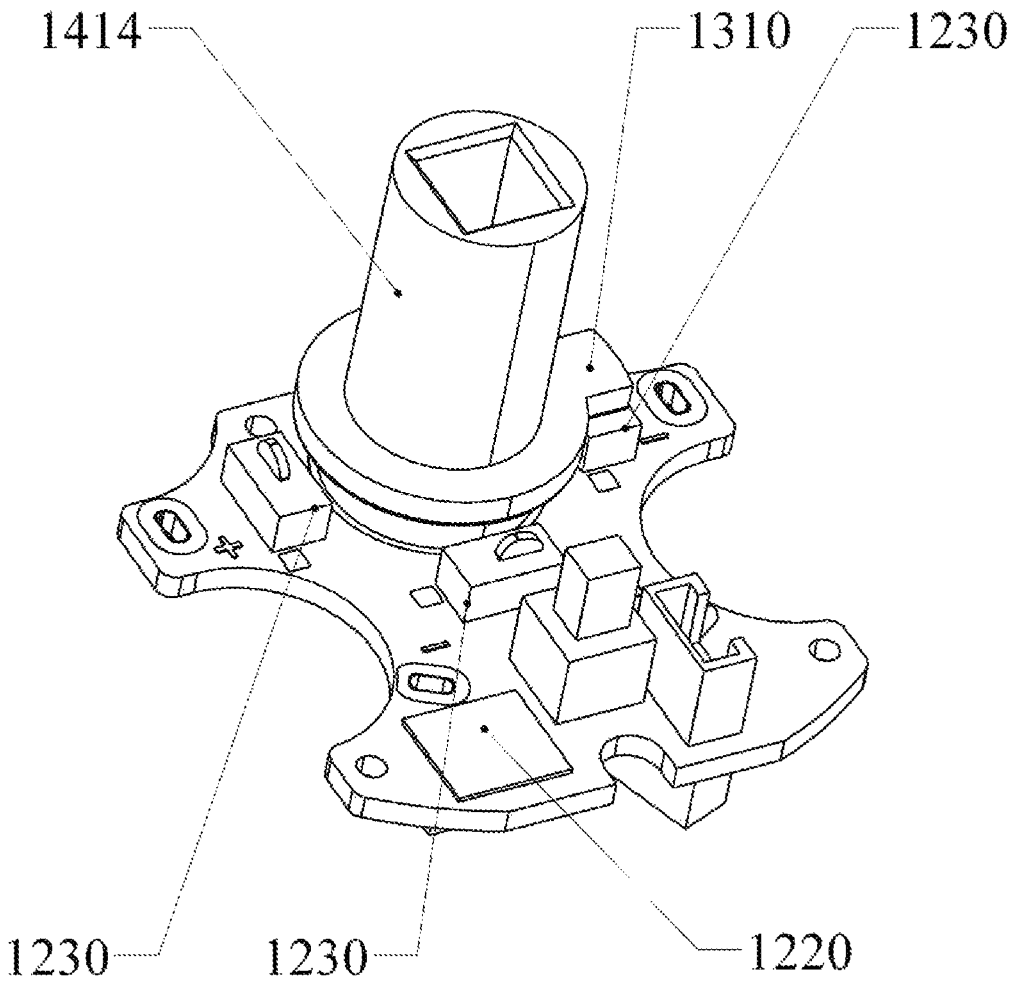
FIG. 11 is a schematic diagram of a circuit board in the application of the present invention.

Referring to FIGS. 10 and 11, the locking device 1200 further includes a locking mechanism 1300 and a circuit board 1210. The locking mechanism 1300 includes a limit member 1310 and at least one motor 1320, which is a deceleration motor and has a driving shaft 1321. The driving shaft 1321 is fixed inside and rotatably connected with the driving gear 1411, and the driving gear 1411 obtains driving power from the motor 1320 to drive the driven gear 1412 to rotate.

In other embodiments (not shown in the figure), the motor 1320 can also be a DC motor or an AC motor. At the same time, the motor 1320 cannot be used in the door lock, and the transmission methods include, but are not limited to, hydraulic transmission or pneumatic transmission.

Referring to FIGS. 9 to 11, the locking mechanism 1300 and the circuit board 1210 are disposed in the inner shell 1400, both of which are located on the second end cover 1420. The circuit board 1210 is detachably arranged on the second end cover 1420, and the driven gear 1412 is connected to the circuit board 1210 through a driving member 1413, and the driving member 1413 is also fixed with a driving post 1414, and part of the driving member 1413 extends beyond the circuit board 1210 so as to be connected with the driving post 1414.

The number of limit switches 1230 on the circuit board 1210 is three, and the three limit switches 1230 are arranged near the driving member 1413. At the same time, the circuit board 1210 is provided with at least one limit switch 1230, and the limit member 1310 is located on the driving member 1413. The limit member 1310 has a protrusion 1311, and the protrusion 1311 is in contact with the limit switch 1230 to control the motor 1320. When the limit member 1310 touches the limit switch 1230, the motor 1320 stops working, which increases the working life of the motor 1320, thus prolonging the service life of the door lock.

Further, the circuit board 1210 is further provided with a control unit 1220, which controls the rotation of the motor 1320. In this embodiment, the control unit 1220 is a MUC, and the operation of the motor can be controlled by the control unit 1220, so as to realize automatic unlocking or automatic locking.

In other embodiments (not shown in the figure), the control unit 1220 can also be a microprocessor, CPU, etc., such as a general-purpose or special-purpose microprocessor, and send programming instructions or micro-control codes for controlling the motor 1320.

Further, the second end cover 1420 is further provided with four battery slots 1431, which surround the circuit board 1210 and supply power to the circuit board 1210.

In other embodiments (not shown in the figure), the number of battery slots 1431 can also be one, or two, or three or other numbers.

Figure 12:
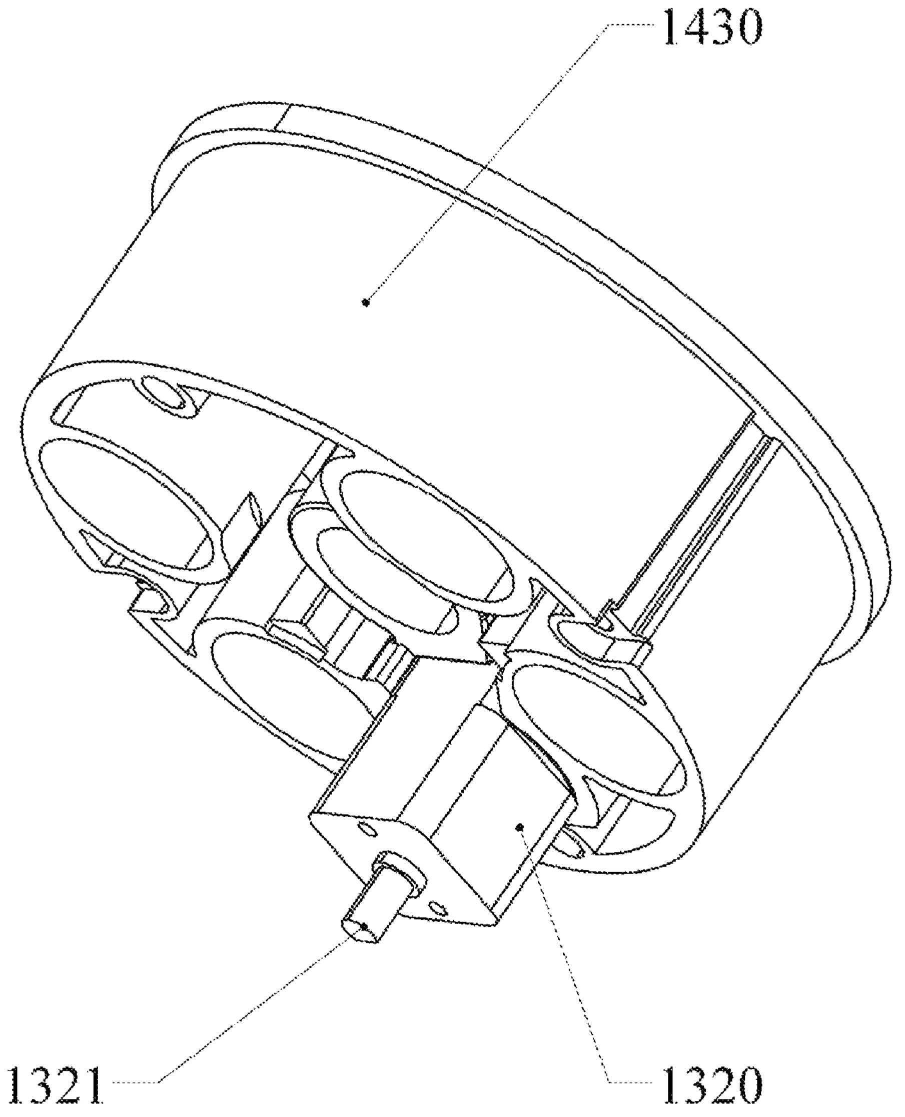
FIG. 12 is a schematic view of the third end cover in the application of the present invention.

Referring to FIG. 12, the motor 1320 is fixed on the third end cover 1430, and the motor body of the motor 1320 is fixedly connected to the third end cover 1430 and connected with the driving gear 1411 through the driving shaft 1321.

Figure 13:
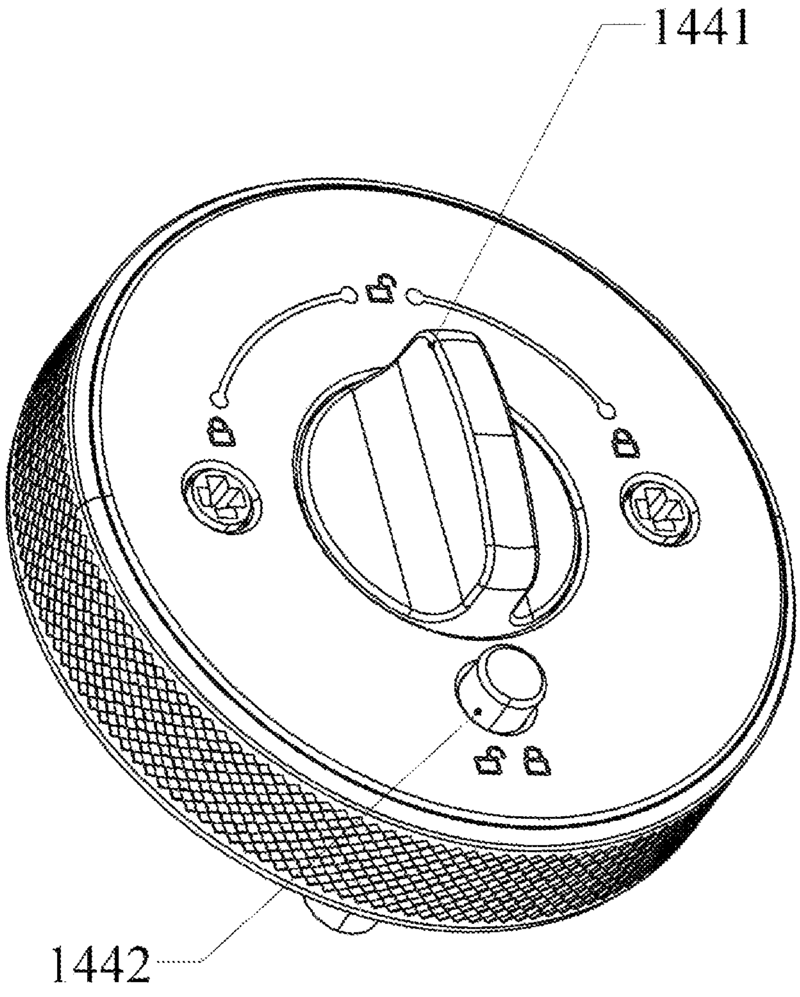
FIG. 13 is a schematic view of the fourth end cover in the application of the present invention.
Figure 14:
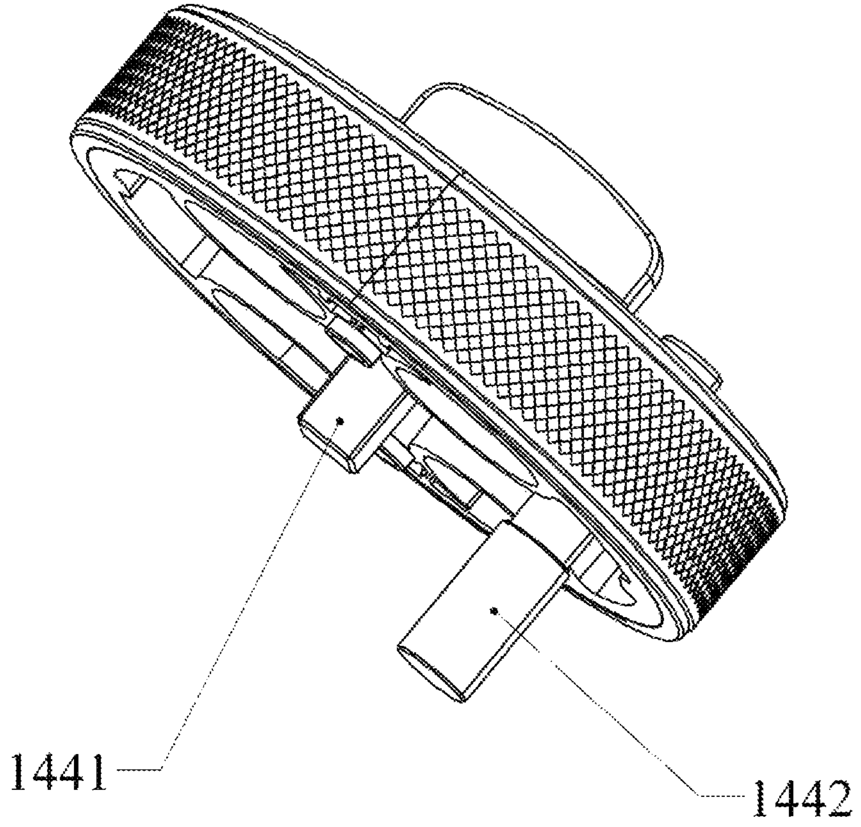
FIG. 14 is a schematic view of the fourth end cover in the application of the present invention.

Referring to FIG. 13 and FIG. 14, the inner shell outer surface 1401 is provided with a mechanical knob 1441, which is inserted into the driving post 1414. Rotating the mechanical knob 1441 can drive the door core 1243 to rotate to lock and unlock the novel multifunctional door lock.

Further, the inner shell outer surface 1401 is provided with an electronic lock button 1442, which is in contact with the circuit board 1210, and at least part of the electronic lock button 1442 extends out of the inner shell 1400. By pressing the part extending out of the inner shell 1400, the electronic lock button 1442 can be telescopically moved in and out of the inner shell 1400, thereby controlling the operation of the motor 1320.

Specifically, the lock tongue module 1240 is in transmission connection with the locking mechanism 1300 by the door core 1243. When the user inputs a password, or a fingerprint, or inserts a key to unlock the door lock, the locking mechanism 1300 can respond to the user's operation. Wherein, the door lock can be unlocked by directly rotating the door core 1243 by inserting the key. If the password and fingerprint are input, the control unit 1220 will calculate and compare the collected password and fingerprint. If the password and fingerprint are correct, it will send out a control signal, and the motor 1320 will work to make the limit member 1310 rotate to the unlocked state, and then drive the lock tongue module 1240 to the unlocked position, thus unlocking the door lock.

After entering the room, the door lock is closed, and the limit member 1310 contacts the limit switch 1230. At this time, the motor 1320 stops working, and the lock tongue module 1240 is in the locked position, thus locking the door lock. Meanwhile, the mechanical knob 1441 can also be manually rotated to make the door lock in the locked state. Or the electronic lock button 1442 on the inner shell 1400 is pressed, and the electronic lock button 1442 will contact the circuit board 1210, so that the motor cannot work, and the door lock can be further locked.

As another preferred embodiment of the present application, the present application further provides a method for accessing a safe space, which includes providing a novel multifunctional door lock.

Figure 7:
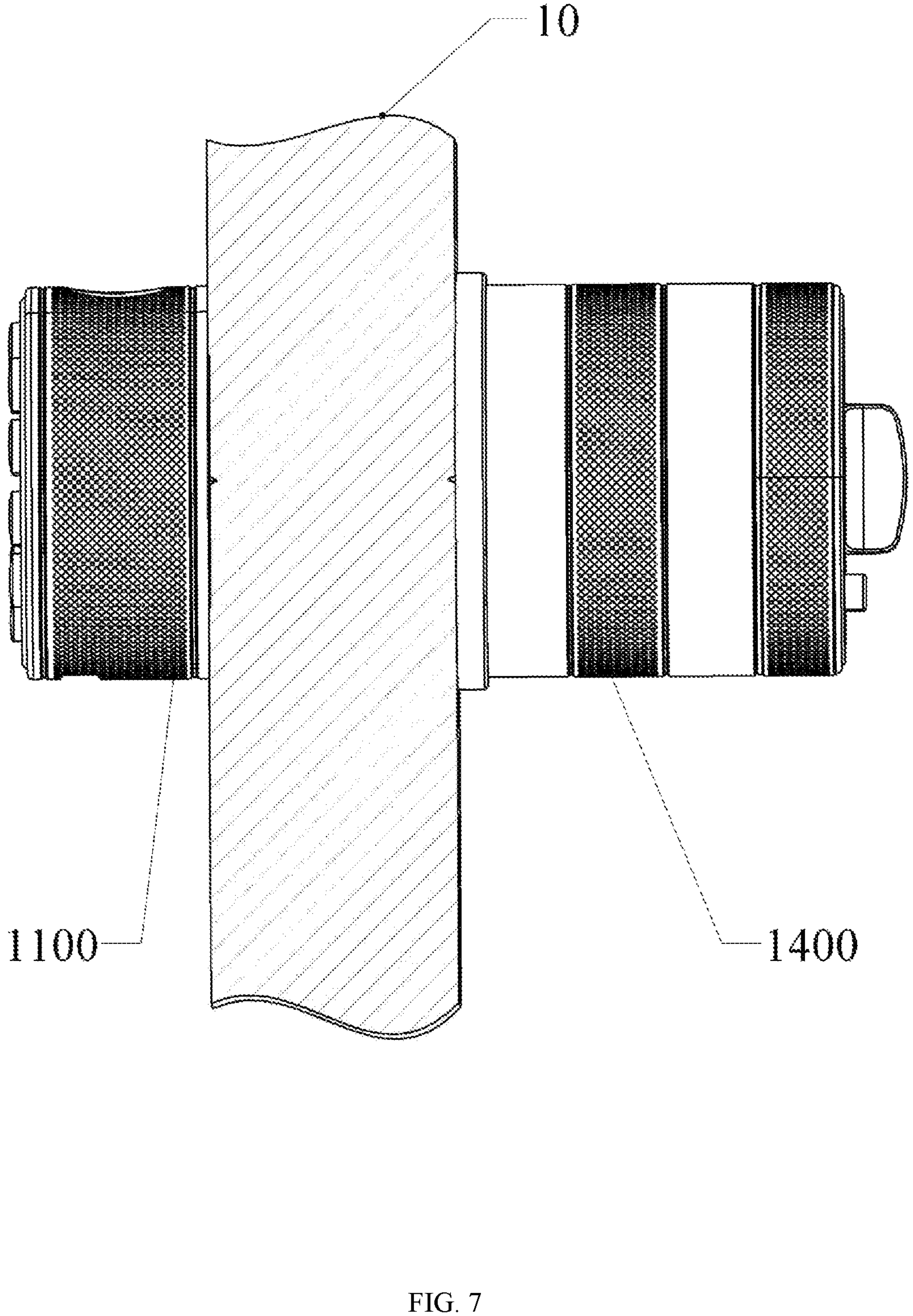
FIG. 7 is a schematic diagram of a novel multifunctional door lock and a door in the application of the present invention.

Referring to FIG. 7, the method includes fixing the novel multifunctional door lock on the door 10, wherein the outer shell 1100 is located outside the door 10 and the inner shell 1400 is located inside the door 10, that is, inside the safe space; a password, or a fingerprint is input through the input module 1120, or a key is inserted to unlock, so that the circuit board 1210 generates a control signal according to the input instruction, and the door lock can be unlocked after the control signal is transmitted to the locking device.

Further, the new multi-functional door lock can be distinguished from the left and right with respect to the installation direction, because when the door lock needs to be installed on the door 10, it may be installed on the left or right side of the door. Therefore, when the door lock is installed in the factory state, the door lock can be set to rotate left or right through a process of automatic detection by the program.

Specifically, the novel multifunctional door lock has three limit switches 1230, one of which is in the corresponding unlocked state. The other two limit switches 1230 are left-handed switches and right-handed switches respectively, and the two switches rotate to the left and to the right respectively when used.

The door lock can be activated, and the door locks can be divided into left-handed door locks and right-handed door locks after activation. If the door lock needs to be installed on the left side of the door, the left-hand door lock is used; when it needs to be installed on the right side of the door, the right-hand door lock is used. Therefore, when the door is installed, only one limit switch 1230 is activated after the program detection, and the system will automatically judge the installation direction of the door lock to determine the rotation direction of the door lock, so as to use the door lock in line with the installation direction. However, if the installation direction of the door lock does not match the left and right definitions of the door lock, the rotation of the motor will be blocked. At this time, the MCU detects the increase of the current of the motor and judges that the motor is blocked, and immediately stops the voltage supply, so that the door lock cannot be unlocked.

Further, the user can use the input module to generate input instructions through biological feature features or physical operations. In this embodiment, the biological feature features or physical operations are not limited as long as the novel multifunctional door lock can be unlocked and locked.

To sum up, the novel multifunctional door lock applied by the present invention has many advantages, mainly including the following points: security: the intelligent door lock uses fingerprint, password and other opening methods, and the security is much higher than that of the traditional lock; structural design optimization: the main body includes an outer shell and an inner shell, and the locking device includes a locking mechanism, a circuit board and a bolt module, which makes the structure of the door lock more compact and more convenient to install and maintain; simple operation: the locking bolt module is in transmission connection with the locking mechanism, and the locking mechanism can respond to the user's operation to drive the locking bolt module to move between the locked position and the unlocked position, which enables the user to conveniently perform unlocking and locking operations; intelligence: the door lock can determine the unlocking direction according to the user's installation direction, and automatically judge the installation direction of the door lock through system detection after installation to switch the working program to match the installation direction to use the door lock; long service life: the limit switch inside the door lock can effectively prevent the motor from blocking rotation, thus prolonging the life of the door lock.

In the broad sense of the application of the present invention, the novel intelligent door lock can be applied to the following fields besides families: intelligent apartments: in apartments: intelligent door locks can conveniently manage the entrance and exit of apartments and provide security protection; hotels: hotels can use smart door locks to manage rooms, providing customers with a more convenient check-in experience; public rental house:

in public rental house, intelligent door locks can conveniently manage tenants' access and provide security protection; smart park: in the smart park, smart door locks can conveniently manage the access to the park and provide security protection; intelligent transportation: in intelligent transportation, intelligent door locks can conveniently manage the access of transportation facilities and provide security protection; office space: in the office space, the intelligent door lock can conveniently manage the access of employees and provide security protection; or various other enclosed spaces that need to be protected.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for case of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A novel multifunctional door lock, comprising a main body and a locking device, wherein said locking device is arranged inside said main body; and wherein said main body is further provided with at least one input module, and said at least one input module is capable of generating an input instruction in response to an operation of a user and transmitting said input instruction to said locking device; and wherein, said locking device comprises a circuit board and at least one locking mechanism, and said circuit board is capable of generating a control signal according to said input instruction; and wherein said at least one locking mechanism is capable of moving between a locked position and an unlocked position in response to said input instruction or said control signal; and wherein said circuit board is provided with at least one limit switch and said at least one locking mechanism comprises a limit member and at least one motor, wherein said limit member is operable to contact said at least one limit switch in said locked position and said unlocked position, and when said limit member contacts said at least one limit switch, said at least one motor will stop working;

wherein said main body comprises an outer shell and an inner shell and said outer shell and said inner shell have spherical structures, which communicate with each other through at least four wires, and each of which has an outer surface, at least part of said outer surface being provided with anti-skid lines.

2. The novel multifunctional door lock according to claim 1, wherein said at least one input module is arranged on said outer shell and said at least one input module includes at least three input modes to unlock and lock said novel multifunctional door lock; and the outer surface of said outer shell is provided with a lock button and an unlock button to control said locking device.

3. The novel multifunctional door lock according to claim 2, wherein said locking device comprises a lock tongue and a lock body, wherein said lock tongue retractably enters and exits said lock body; and said lock body is detachably fixed in said main body through at least one door core and a fastener and said lock tongue is exposed outside said main body.

4. The novel multifunctional door lock according to claim 3, wherein the outer surface of said inner shell is provided with a mechanical knob and an electronic lock button; and said mechanical knob is capable of controlling said at least one door core to lock and unlock said novel multifunctional door lock and said electronic lock button is capable of controlling a working state of said at least one motor.

5. The novel multifunctional door lock according to claim 4, wherein said electronic lock button is arranged inside said inner shell and is in contact with said circuit board; and at least a part of said electronic lock button extends out of said inner shell and retractably enters and exits said inner shell.

6. A novel multifunctional door lock, comprising a main body, a locking device and an input module; and wherein, said main body comprises an outer shell and an inner shell, and said locking device comprises a locking mechanism, a circuit board and a lock tongue module; and wherein, said locking mechanism and said circuit board are arranged in said inner shell, said input module is arranged in said outer shell, and said lock tongue module is arranged between said outer shell and said inner shell; and wherein, said lock tongue module is in transmission connection with said locking mechanism, and said locking mechanism is capable of responding to an operation of a user to drive said lock tongue module to move between a locked position and an unlocked position; and wherein said circuit board is provided with at least one limit switch and said locking mechanism comprises a limit member and at least one motor, wherein said limit member is operable to contact said at least one limit switch in said locked position and said unlocked position, and when said limit member contacts said at least one limit switch, said at least one motor will stop working.

7. The novel multifunctional door lock according to claim 6, wherein said outer shell and said inner shell each have an outer surface, and at least part of the outer surfaces of said outer shell and said inner shell is provided with anti-skid lines; and said input module comprises a password button, a buttonhole and a fingerprint device; and said input module is located on the outer surface of said outer shell, and said outer shell and said inner shell are connected through a fastener.

8. The novel multifunctional door lock according to claim 7, wherein said lock tongue module comprises a lock tongue and a lock body, said lock body is fixed between said outer shell and said inner shell through a door core and said fastener, one end of said door core is inserted into said buttonhole, and another end is inserted into said inner shell.

9. The novel multifunctional door lock according to claim 8, wherein said inner shell comprises a structure of four layers, namely a first end cover, a second end cover, a third end cover and a fourth end cover, which are detachably connected, and said door core is connected and fixed on said first end cover.

10. The novel multifunctional door lock according to claim 9, wherein said first end cover is provided with a driving gear and a driven gear, said door core extends inside said first end cover and is connected to said driven gear, and said driving gear and said driven gear are in rotational contact.

11. The novel multifunctional door lock according to claim 10, wherein said driving gear is connected with said at least one motor, said at least one motor is fixed on said third end cover; and said at least one motor is a deceleration motor and has a driving shaft, which is fixed inside said driving gear and rotatably connected with said driving gear.

12. The novel multifunctional door lock according to claim 11, wherein said circuit board is detachably arranged on said second end cover, said driven gear is connected to said circuit board through a driving member, and at least part of said driving member extends beyond said circuit board.

13. The novel multifunctional door lock according to claim 12, wherein said circuit board is further provided with a control unit which controls the rotation of said at least one motor and said second end cover is further provided with four battery slots which surround said circuit board and supply power to said circuit board.

14. The novel multifunctional door lock according to claim 13, wherein a number of said at least one limit switch is three, and said at least one limit switch arranges near said driving member, said limit member is located on said driving member, and said limit member has a protrusion, and said protrusion is in contact with said at least one limit switch to control said at least one motor.

15. The novel multifunctional door lock according to claim 14, wherein a driving post is also fixed on said driving member, and a mechanical knob is arranged on the outer surface of said inner shell, and said mechanical knob is inserted into said driving post; and said mechanical knob is rotated drive said door core to rotate to lock and unlock said novel multifunctional door lock.

16. The novel multifunctional door lock according to claim 15, wherein the outer surface of said inner shell is provided with an electronic lock button which is in contact with said circuit board, at least part of said electronic lock button extends out of said inner shell and retractably enters and exits said inner shell; and said electronic lock button is capable of controlling the operation of said at least one motor.

17. A method for accessing a safe space, comprising: providing a novel multifunctional door lock, which comprises a main body and a locking device, wherein said locking device is arranged inside said main body; and wherein said main body is further provided with at least one input module, and said at least one input module is capable of generating an input instruction in response to an operation of a user and transmitting said input instruction to said locking device; and wherein, said locking device comprises a circuit board and at least one locking mechanism, and said circuit board is capable of generating a control signal according to said input instruction; and wherein said at least one locking mechanism is capable of moving between a locked position and an unlocked position in response to said input instruction or said control signal; and wherein said circuit board is provided with at least one limit switch and said at least one locking mechanism comprises a limit member and at least one motor, wherein said limit member is operable to contact said at least one limit switch in said locked position and said unlocked position, and when said limit member contacts said at least one limit switch, said at least one motor will stop working;

said method further comprising:

fixing said novel multifunctional door lock on a door;

generating an input instruction by said at least one input module; and unlocking or locking said novel multifunctional door lock by said locking device;

wherein said limit member is set to rotate only to left or right; and before using said novel multifunctional door lock, a rotation direction of said limit member is determined and recorded in said circuit board to determine an installation direction of said novel multifunctional door lock.

18. The method according to claim 17, wherein, a user generates the input instruction through a biological feature or a physical operation by using said at least one input module, and a control signal is generated for said locking device to unlock said novel multifunctional door lock to open the door.

* * * * *